Patented Aug. 17, 1954

2,686,807

UNITED STATES PATENT OFFICE 2,686,807

TETRAMETHYL-THIURAM-MONOSULFIDE

Martin L. Nadler, Wilmington, Del., assignor to E. I. du Pont de Nemours & Company, Wilmington, Del., a corporation of Delaware No Drawing. Application March 30, 1950, Serial No. 152,990

10 Claims. (Cl. 260—567)

This invention relates to tetramethyl-thiuram-monosulfide that has been treated to place it in a form which has improved milling and dispersing properties in elastoprenes and to the method for so treating the tetramethyl-thiuram-monosulfide.

Tetramethyl - thiuram - monosulfide is a well known accelerator for the vulcanization of elastoprenes, such as natural and synthetic rubbers. Ordinarily, it is in the form of a fine dry powder and is incorporated in solid elastoprenes by milling on a rubber mill. When it is attempted to so incorporate the tetramethyl-thiuram-monosulfide into an elastoprene, it flies as a dust, both during handling and at the rubber mill. Such dusting results in loss of valuable material, deposition thereof on the skin of the operator and inhalation thereof by the operator. Tetramethyl-thiuram-monosulfide is irritating to the skin of many persons and its inhalation causes unpleasant physiological reactions.

Also, during such milling operations, the tetramethyl-thiuram-monosulfide tends to cake on the back roll of the rubber mill, thereby lengthening the time cycle of the milling operation since the operator must scrape the caked material from the roll and again add it to the batch of elastoprene being milled. This problem of caking is especially severe when it is attempted to prepare a concentrated masterbatch of the accelerator in the elastoprene, and particularly when large commercial mills of 30 inch roll diameter or greater are used and the elastoprene temperatures become high.

In the past, attempts have been made to reduce the dustiness of tetramethyl-thiuram-monosulfide by adding various agents thereto, such as oils, at various stages of its manufacture, and selling the product as a ground powder. Although such products have been markedly less dusty than the untreated material, they definitely were not dustless. Furthermore, such treatments have not satisfactorily reduced the tendency of the tetramethyl-thiuram-monosulfide to cake and fuse on the rolls of the mill, but, in some cases, have actually increased such tendency.

It is an object of my invention to produce tetramethyl - thiuram - monosulfide in a form which is substantially dustless and which does not tend to cake and fuse on the rolls of rubber mills. Another object is to produce coated particles of tetramethyl-thiuram-monosulfide which may be readily formed into dustless frangible compacted aggregates that have sufficient strength to withstand the normal conditions of handling, transportation and storage without becoming disintegrated to a material extent, but yet are sufficiently frangible to completely disintegrate into discrete particles upon being milled with unvulcanized rubber without dusting or caking on the rolls of the rubber mill. Still another object is to provide a novel process for improving the milling and dispersing properties of tetramethyl-thiuram-monosulfide in an elastoprene. A further object is to provide a method for treating tetramethyl-thiuram-monosulfide so that it will be substantially dustless and will not cake on the rolls of the rubber mill and, particularly, so that it may be readily shaped into dustless frangible compacted aggregates, and for preparing such aggregates. A still further object is to provide a solid vulcanizable elastoprene having dispersed therein from about 10% to about 30% by weight of the treated tetramethyl-thiuram-monosulfide. Other objects are to provide new compositions of matter and to advance the art. Still other objects will appear hereinafter.

The above and other objects may be accomplished by coating finely divided particles of tetramethyl - thiuram - monosulfide with from about 0.5% to about 3% by weight of a casein substance, such as casein and alkaline caseinates, and from about 1% to about 5% of a triaryl phosphate which is liquid at 60° C. and in which the aryl radicals are of the benzene series; and, preferably, forming such particles into dustless frangible compacted aggregates which have sufficient mechanical strength to withstand the normal conditions of handling, transportation and storage without material disintegration, and yet which disintegrate readily upon being milled with unvulcanized rubber.

The coated particles of tetramethyl-thiuram-monosulfide are prepared by intimately mixing, with an aqueous slurry of finely divided tetramethyl-thiuram-monosulfide, an aqueous dispersion of a casein substance of the group of casein and alkaline caseinates and an aqueous dispersion of a triaryl phosphate which is liquid at 60° C. and in which the aryl radicals are of the benzene series, employing from about 0.5% to about 3% by weight of the casein substance based on the tetramethyl-thiuram-monosulfide and from about 1% to about 5% by weight of the triaryl phosphate based on the tetramethyl-thiuram-monosulfide, filtering out the resulting coated particles of tetramethyl-thiuram-monosulfide from the aqueous solution and washing such particles with water; the mixing, filtering and washing operations being carried out at a temperature from about 20° C. to about 80° C.

The resulting coated particles may be dried and then used for milling into an elastoprene. Such dry coated particles of tetramethyl-thiuram-monosulfide are substantially non-dusting and non-caking, that is, they will not dust (fly) or cake on the rolls of rubber mills when they are milled into an elastoprene in the usual manner. They disperse into the elastoprene rapidly and in a uniform manner without being compacted into aggregates.

On the other hand, the coated particles of tetramethyl-thiuram-monosulfide, with or without drying, may be readily formed into substantially dustless frangible compacted aggregates which have sufficient mechanical strength to resist disintegration in normal handling, transportation and storage, but which are sufficiently frangible to completely disintegrate into fine discrete particles when milled with an elastoprene on an ordinary rubber mill, and readily and rapidly disperse into the elastoprene in finely divided form in a uniform manner. Such aggregates may be prepared by compacting the washed particles under pressure into an apparently homogeneous, smoothly flowing plastic mass and then shaping such mass into aggregates of the desired size. Usually, such aggregates will have a width of $\frac{1}{16}$ to $\frac{1}{4}$ inch, a thickness from $\frac{1}{16}$ to $\frac{1}{4}$ inch and a length from $\frac{1}{16}$ to about 1 inch.

The slurry of tetramethyl-thiuram-monosulfide may be made from ordinary dry powdered tetramethyl-thiuram-monosulfide, obtained by any of the known methods, by merely mixing the dry powder into water. Particularly satisfactory tetramethyl-thiuram-monosulfide is that made by the process of Somers in Patent No. 2,099,773. It will usually be most convenient to treat the tetramethyl-thiuram-monosulfide in the slurry obtained in its manufacture, particularly the slurry of tetramethyl-thiuram-monosulfide obtained in the process of Somers in Patent No. 2,099,773, which, preferably, has a pH of from about 7.5 to 9.0. In either case, the tetramethyl-thiuram-monosulfide, before and after coating, will be in finely divided form, substantially all of the particles being of a size to pass through a standard screen of about 100 mesh.

The casein substance may be casein or an alkaline caseinate, such as ammonium caseinate, sodium caseinate and potassium caseinate. However, casein is preferred. The casein substance will be dispersed in an aqueous medium and such dispersion added to an aqueous slurry of tetramethyl-thiuram-monosulfide at any time during or after its manufacture. For example, part or all of the casein substance may be added during the manufacture of the tetramethyl-thiuram-monosulfide by the process disclosed by Somers in Patent No. 2,099,773, employing such casein substance as the sole wetting and dispersing agent or in addition to the other wetting and dispersing agents disclosed by Somers. If only part of the desired amount of casein substance is employed in the process of Somers, then the rest of the casein substance will be added to the final slurry obtained in the Somers' process or to a slurry formed from the separated product.

The triaryl phosphate should be liquid at 60° C. and, preferably, should be liquid at 25° C.; that is, it should have a melting point below 60° C. and, preferably, below 25° C. The selection of the triaryl phosphate will depend upon the temperature employed in the coating step, as it must be liquid at such temperature. The triaryl phosphate should be one in which the aryl radicals are of the benzene series. The term "aryl" is employed in its commonly understood, restricted sense as meaning a monovalent aromatic hydrocarbon radical in which the free valence is on a ring carbon atom; that is, an aromatic radical which consists of carbon and hydrogen. Also, the term "aryl radicals of the benzene series" is employed in its commonly understood, restricted sense to include only those radicals which contain a single benzene ring. The triaryl phosphate may be a single homogeneous compound; that is, one in which all of the aryl radicals are the same, as in triphenyl phosphate and tri-o-cresyl phosphate. Usually, however, the triaryl phosphate will be a mixed triaryl phosphate or mixture of such mixed triaryl phosphates, such as are obtained from a mixture of monohydric phenols. Representative mixed phosphates and mixtures thereof are cresyl diphenyl phosphate, prepared from a mixture consisting of 33% of mixed cresols and 66% of phenol employed in Example 3; and tricresyl phosphates prepared from a mixture of cresols. The tricresyl phosphate of Example 1 was prepared from a commercial mixture of p-cresol and m-cresol and had a melting point of about −35° C. Other suitable triaryl phosphates may be prepared from the xylenols, carvacrol, thymol and the like or mixtures of 2 or more thereof or mixtures thereof with cresols or phenol. The preferred triaryl phosphates are those prepared from a mixture of cresols, such as that of Example 1.

The casein substance will be employed in a proportion of from about 0.5% to about 3% by weight based on the tetramethyl-thiuram-monosulfide and, preferably, in a proportion of from about 0.5% to about 1%. The triaryl phosphate will be employed in a proportion of from about 1% to about 5% by weight based on the tetramethyl-thiuram-monosulfide and, preferably, in a proportion of about 3%. Proportions of triaryl phosphate and casein substance, materially smaller or larger than the ranges above given, fail to yield products having the desired properties.

The slurry of tetramethyl-thiuram-monosulfide may be first treated with a dispersion of the casein substance, and subsequently with a dispersion of the triaryl phosphate. For example, the tetramethyl-thiuram-monosulfide may be prepared by the process disclosed by Somers in Patent No. 2,099,773, employing the required amount of casein substance as the sole wetting and dispersing agent or in addition to the other wetting and dispersing agents disclosed by Somers. The resulting slurry may then be treated with the triaryl phosphate or the tetramethyl-thiuram-monosulfide may be separated therefrom, re-slurried and then treated with the triaryl phosphate. Preferably, however, the slurry of tetramethyl-thiuram-monosulfide will be treated with the casein substance and the triaryl phosphate simultaneously, as by adding thereto a dispersion containing both the casein substance and the triaryl phosphate.

The casein substance and the triaryl phosphate may be simply mixed in water to provide the aqueous dispersions to be added to the slurry of tetramethyl-thiuram-monosulfide. Preferably, however, the dispersions of the casein substance and of the triaryl phosphate will be prepared with the aid of dispersing agents, such as the water-soluble alkali salts of long chain alkyl sulfonates, the water-soluble alkali salts of polynuclear aryl sulfonates, the water-soluble alkali salts of the sulfates of long chain alcohols, soaps, alkaline caseinates and the like. The alkali salts will generally be ammonium, sodium or potassium salts. By "long chain" alkyl sulfonates or alcohols, I mean that the chains contain from about 12 to about 20 carbon atoms. The sulfonates will usually contain from 1 to 2 sulfonic acid groups. The polynuclear aryl sulfonates will contain from 2 to about 4 benzene rings, including fused rings as in naphthalene, and, except for the sulfonic acid groups, will consist of carbon and hydrogen. While the alkaline caseinates may be used as the sole dispersing agents, preferably, they will be employed in combination with other dispersing agents.

Preferably, the dispersions of the casein substances and of the triaryl phosphates will be prepared at a temperature of from about 80° C. to about 100° C. However, the treatment of the slurry of tetramethyl-thiuram-monosulfide with the dispersions should be carried out at a temperature of from about 20° C. to about 80° C., usually, at from about 25° C. to about 60° C. Preferably, such coating operation is carried out at temperatures of from about 50° C. to about 60° C., particularly when triphenyl phosphate is employed as the triaryl phosphate. After the casein substance and the triaryl phosphate have been added to the slurry of tetramethyl-thiuram-monosulfide, the temperature may be reduced to below the melting point of the triaryl phosphate without disadvantage.

After the casein substance and triaryl phosphate have been added to the slurry of tetramethyl - thiuram - monosulfide and thoroughly mixed therewith, the slurry will be filtered and the filter cake washed with water to free the coated tetramethyl-thiuram-monosulfide from the liquid and from the wetting agents other than the alkaline caseinates. The alkaline caseinates are adsorbed on the tetramethyl-thiuram-monosulfide particles and are not removed therefrom to any material extent by the washing. The resulting filter cake may be dried and ground to provide discrete coated particles of tetramethyl-thiuram-monosulfide for milling with an elastoprene. Such dried particles may be compacted into dustless frangible compacted aggregates. Preferably, however, the wet filter cake will be compacted into aggregates and then dried to produce the desired dustless frangible compacted aggregates. Such washing, drying and compacting steps should be carried out at a temperature of from about 20° C. to about 80° C. and, preferably, at from about 20° C. to about 60° C.

A great variety of mechanical means are well known for compacting wet or dry materials into aggregates. Such means are suitable for forming the aggregates of my invention. Suitable mechanical means of this character are pelleting machines, roll mills, extruding machines, granulators, and the like. According to the type of mechanical means employed, the coated tetramethyl-thiuram-monosulfide particles will be compressed into pellets, plates, sheets or rods which may then be shaped to aggregates of the desired size, as by molding, cutting or granulating. One particularly suitable method for forming aggregates of the desired size comprises extruding the material through an extruder which is fitted with knife blades which pass over the outside of the die plate and cut the extruded rods into the desired length; the length depending upon the speed or number of knives. The preferred method of forming the aggregates is that disclosed in Example 2.

The aggregates should have a width of from $\frac{1}{16}$ to $\frac{1}{4}$ inch, a thickness of from $\frac{1}{16}$ to $\frac{1}{4}$ inch and a length of from $\frac{1}{16}$ to about 1 inch; and, preferably, should have a width of about $\frac{1}{8}$ inch, a thickness of about $\frac{1}{8}$ inch and a length of from about $\frac{1}{8}$ to about 1 inch. The aggregates should have a mechanical strength such that they do not readily disintegrate to a powder under the conditions encountered in normal handling, transportation and storage, but should be sufficiently frangible that they readily disintegrate to their original discrete particles when they are milled with an unvulcanized elastoprene in the usual manner. The mechanical strength of the aggregates may be measured by a ball mill test which consists in placing a 50 gram sample of the aggregates in a 16 ounce, wide mouth bottle together with 8 steel balls, each ball being about $\frac{1}{2}$ inch in diameter, then rotating the bottle end over end at 42 R. P. M. for 5 minutes, and then screening the product on a 16 mesh screen and determining the amount of material which passes through such screen. Aggregates, having the desired mechanical strength, should resist disintegration under such conditions to the extent that not more than substantially 5% thereof will be disintegrated sufficiently to pass through the 16 mesh screen. I have found that aggregates, having the desired mechanical strength, are uniformly obtained most conveniently by compacting the washed, wet particles under pressure into an apparently homogeneous, smoothly flowing plastic mass which retains its shape, then shaping such mass into aggregates of the desired size by molding, cutting or granulating, and then drying. By "apparently homogeneous," I mean that the mass appears to be fused together and to be free of lumps, aggregates and other observable distinct parts. By "smoothly flowing plastic mass," I mean that the mass will flow in a smooth manner under deforming pressures without crumbling or breaking up into separate masses. By a mass "which retains its shape," I mean that the mass will retain its shape in the absence of external deforming pressure.

The coated tetramethyl-thiuram-monosulfide particles and the dustless frangible compacted aggregates formed thereby are particularly adapted for compounding with solid vulcanizable elastoprenes on the ordinary rubber mill, and, especially, for making masterbatches by milling into elastoprenes from about 10% to about 30% by weight of the coated tetramethyl-thiuram-monosulfide based on the elastoprene. Such coated tetramethyl-thiuram-monosulfide disperses rapidly and readily in the elastoprene with substantially no dusting and without caking or fusing on the rolls of the rubber mill.

The term "elastoprene" as applied herein and in the claims is employed in the sense proposed by Harry L. Fisher in his "Nomenclature of Synthetic Rubbers" appearing on pages 900 to 907 of Rubber Chemistry and Technology, volume 12 (1939). This term includes natural rubber, haloprene derivatives, such chloroprene polymers and fluoroprene polymers, synthetic isoprene rubbers, synthetic butadiene polymers, mono- and dimethyl butadiene polymers, copolymers of butadienes and acrylic derivatives, and piperylene rubbers.

In order to more clearly illustrate my invention, preferred modes of carrying the same into effect and advantageous results to be obtained thereby, the following examples are given:

Example 1

A slurry of 600 pounds of tetramethyl-thiuram-monosulfide (dry basis) in 3000 pounds of water was prepared by the action of cyanogen chloride on sodium dimethyl dithio carbamate according to the method outlined by Somers in U. S. 2,099,773, employing as a dispersing agent triethanolamine oleate corresponding 0.25% oleic acid based on the tetramethyl-thiuram-monosulfide plus an excess of triethanolamine. Separately, 6 pounds of casein and 6 pounds of a mixture of long chain alkyl sodium sulfonates, containing an average of 16 carbon atoms, were added to about 100 pounds of water and the mixture was heated to about 90° C. with mild stirring. 18 pounds of tricresyl phosphate were added to this mixture with additional stirring and the resulting emulsion was then added to the slurry of tetramethyl-thiuram-monosulfide. The slurry was agitated for 20 minutes to insure complete incorporation of the casein and tricresyl phosphate. The temperature of the slurry, at the time of addition, was about 50° C. The slurry was cooled to about 30° C., filtered on a vacuum filter, and washed with 400 pounds of water to remove soluble inorganic salts (NaC- and NaSCN are by-products of the reaction by which tetramethyl-thiuram-monosulfide is formed). The triethanolamine oleate, triethanolamine and long chain alkyl sodium sulfonates were largely washed out at this point. The resulting wet filter cake, containing about 23.5% water, was then fed into a screw type extruder (a conventional screw type meat chopper) with a 4 inch barrel equipped with a die plate having $\frac{3}{16}$ inch holes, and extruded in the form of apparently homogeneous, smoothly flowing rods which retained their shape. The extruder was equipped with rotating knife baldes, attached to shaft of the screw and passing over the outside face of the die plate, so as to cut the extruded rods into lengths of about 1 inch. The resulting aggregates were then dried in a circulating air oven at a dry bulb temperature of about 70° C. The melting point of the dry product was 107.4° C. and the ash content was 0.2%. The aggregates were firm and did not readily disintegrate on handling, about 2% of the product being disintegrated sufficiently to pass through a 16 mesh screen after being subjected to the ball mill test.

When tetramethyl-thiuram-monosulfide was prepared by the method of Somers, filtered, washed, dried and then slurried in water and such slurry was used in the above process, similar results were obtained.

Example 2

The rods from the extruding machine of Example 1, without drying, were granulated in a well known commercial granulator which comprises a semi-circular trough, the bottom of which is formed by a six mesh wire screen, provided on the inside with a series of baldes arranged parallel to the axis of the trough and given a circular, back and forth or oscillating motion over the inner surface of the screen. These blades knead the extruded rods together into a mass and rub such mass through the screen. (The undried extruded material is sufficiently firm and non-cohesive to be handled as separate rods in the drying operation and yet readily coalesces when kneaded together). The material issues from the under side of the screen as jointed continuous structures, each consisting of a series of short prisms of approximately $\frac{1}{8}$ inch square cross section (corresponding to the orifices of the screen), with the direction of the sides changing through an angle at each joint (which corresponds to the reversal of the direction of travel of the blades which press the material through the screen). These joints are points of weakness in the extruded structures. As the latter grow longer, they break under their own weight at these points, forming aggregates consisting of several jointed prisms, with an overall length of about $\frac{1}{8}$ to about $\frac{1}{2}$ inch. These are dried as described in Example 1. Only about 2% of this product would pass through a 16 mesh screen when subjected to the ball mill test.

The operation of the granulator is described above for a mass containing 23.5% water. The water content may vary from about 20% to about 35%. The former gives aggregates between about $\frac{1}{8}$ and $\frac{1}{2}$ inch in length, while the latter gives aggregates about $\frac{1}{2}$ to about 2 inches in length. Thus, the average length may be controlled by controlling the water content of the material.

A 2 pound sample, of the tetramethyl-thiuram-monosulfide aggregates of about $\frac{1}{8}$ to about $\frac{1}{2}$ inch in length, was tested by making up as a 20% masterbatch in pale crepe rubber on a 30 inch diameter roll mill with the temperature of the rolls of the mill held at 70° C. by internal hot water heating. The batch incorporated rapidly without dusting and with no caking on the back roll of the mill. At the end of the milling, the rolls of the mill were clean and shining. A sample of the rubber was stretched out into a thin film and examined for undispersed particles of tetramethyl-thiuram-monosulfide. The tetramethyl-thiuram-monosulfide was completely dispersed in the rubber.

By way of comparison, 2 pounds of commercial dry ground tetramethyl-thiuram-monosulfide were milled into rubber under similar conditions. A considerable amount of unpleasant dusting occurred at the mill, the tetramethyl-thiuram-monosulfide incorporated slowly, and tetramethyl-thiuram-monosulfide fused on the back roll of the mill. It was necessary to scrape this fused material from the roll and add it back to the batch.

Example 3

Similar results were obtained when Example 1 was modified by using:

a. 0.5% of casein;
b. Cresyl diphenyl phosphate, instead of tricresyl phosphate; and
c. The sodium salts of the dinaphthyl methane sulfonic acids ("Daxad 11"), made by condensing naphthalene, formaldehyde and sulfuric acid, in place of the sodium salts of the alkyl sulfonic acids.

When materially less than 1.0% of phosphate and materially less than 0.5% of casein are used, the particles of tetramethyl-thiuram-monosulfide are not sufficiently coherent. On the other hand, casein, in proportions materially greater than 3%, and phosphate, in proportions materially greater than 5%, give aggregates which do not have the required mechanical strength.

Example 4

The following experiment illustrates the much less desirable results that are obtained when a lubricating oil is used instead of a triaryl phosphate. Under the conditions described in Example 1, an emulsion of 24 pounds "Circo Light Process Oil," a high naphthenic type of lubricating oil, 5 pounds casein and 6 pounds of the mixture of long-chain alkyl sodium sulfonates of Example 1 in water was added to an aqueous slurry containing 600 pounds tetramethyl-thiuram-monosulfide. The filter cake was extruded and granulated, as in Examples 1 and 2, at 24.8% water. On drying, the resulting granules were softer and disintegrated more readily than those prepared under Example 1. The dry product melted at 107.2° C. When tested by masterbatching in rubber as before, there was a noticeable, objectionable amount of smoking at the mill due to the presence of the oil, and also there was caking on the back roll of the mill.

Similarly, replacing the triaryl phosphates of the present invention with stearic acid, gave much inferior results, giving rise to filter cakes which showed very undesirable thixotropic properties during the compression step.

It will be apparent that the preceding examples are given for illustrative purposes solely and that my invention is not limited to the specific embodiments disclosed therein. It will be readily apparent to those skilled in the art that many variations and modifications can be made in the casein substance, the triaryl phosphate and the mode of operation within the scope of my invention as hereinbefore disclosed, without departing from the spirit or scope of my invention.

The coated tetramethyl-thiuram-monosulfide products of my invention are virtually dustless, have a greatly reduced tendency to cake on the back roll of the rubber mill during milling operations with the elastoprenes, and disperse in the elastoprenes at a much more rapid rate than the products of the prior art and, particularly, are superior in these respects to oil treated powders of tetramethyl-thiuram-monosulfide. The dustless frangible compacted aggregates have the further advantages of being free-flowing as compared to ground powders, do not readily disintegrate back to powder during normal handling, and do not present the physiological hazards of the powders. Accordingly, the aggregates are much easier to handle and to incorporate in the elastoprenes. Furthermore, the formation of the material into aggregates makes it unnecessary to grind the material and hence substantial economies are obtained by eliminating the usual grinding step. The formation of the aggregates from the wet filter cake not only eliminates the grinding step, but has the further advantage that the material may be more readily dried, since the wet aggregates are suitable for continuous drying in a through-circulation type of air dryer. Also, the addition of the casein substance and the triaryl phosphate to the slurry, obtained in the preparation of the tetramethyl-thiuram-monosulfide, has the advantage of improving the filtration rate of the slurry. It will thus be apparent that my invention constitutes a valuable advance in and contribution to the art.

It will be noted that, by my invention, I impart apparently inconsistent and opposite properties to the particles of tetramethyl-thiuram-monosulfide. For example, the particles may be compacted into aggregates under pressure, but do not cake on the rubber mill or form aggregates when milled with elastoprenes. Also, the compacted aggregates have considerable mechanical strength so as to resist disintegration during handling, but yet are frangible so that they readily disintegrate to their ultimate particles upon milling with an elastoprene. These are properties which the untreated tetramethyl-thiuram-monosulfide does not have and which could not be obtained by the use of oils and similar expedients of the prior art.

I claim:

1. Particles of tetramethyl-thiuram-monosulfide of a size to pass through a standard screen of substantially 100 mesh, coated with from about 0.5% to about 3% of a member of the group consisting of casein, ammonium caseinate, sodium caseinate and potassium caseinate and from about 1% to about 5% of a triaryl phosphate which is liquid at 60° C. and in which the aryl radicals are of the benzene series.

2. Particles of tetramethyl-thiuram-monosulfide of a size to pass through a standard screen of substantially 100 mesh, coated with from about 0.5% to about 3% of casein and from about 1% to about 5% of a triaryl phosphate which is liquid at 60° C. and in which the aryl radicals are of the benzene series.

3. Particles of tetramethyl-thiuram-monosulfide of a size to pass through a standard screen of substantially 100 mesh, coated with from about 0.5% to about 1% of casein and from about 1% to about 5% of a triaryl phosphate which is liquid at 60° C. and in which the aryl radicals are of the benzene series.

4. Particles of tetramethyl-thiuram-monosulfide of a size to pass through a standard screen of substantially 100 mesh, coated with from about 0.5% to about 3% of a member of the group consisting of casein, ammonium caseinate, sodium caseinate and potassium caseinate and from about 1% to about 5% of a tricresyl phosphate which is liquid at 60° C.

5. Particles of tetramethyl-thiuram-monosulfide of a size to pass through a standard screen of substantially 100 mesh, coated with from about 0.5% to about 1% of casein and about 3% of a triaryl phosphate which is liquid at 60° C. and in which the aryl radicals are of the benzene series.

6. Particles of tetramethyl-thiuram-monosulfide of a size to pass through a standard screen of substantially 100 mesh, coated with about 1% of casein and about 3% of a tricresyl phosphate which is liquid at 60° C.

7. Dustless frangible compacted aggregates of particles of tetramethyl-thiuram-monosulfide, said particles being of a size to pass through a standard screen of substantially 100 mesh and being coated with from about 0.5% to about 3% of a member of the group consisting of casein, ammonium caseinate, sodium caseinate and potassium caseinate and from about 1% to about 5% of a triaryl phosphate which is liquid at 60° C. and in which the aryl radicals are of the benzene series; and said aggregates having a width of from $\frac{1}{16}$ to $\frac{1}{4}$ inch, a thickness of from $\frac{1}{16}$ to $\frac{1}{4}$ inch, and a length of from $\frac{1}{16}$ to about 1 inch, and having a mechanical strength such that not more than substantially 5% thereof will be disintegrated sufficiently to pass through a 16 mesh screen when a 50 gram sample is tumbled in a 16 ounce bottle with eight $\frac{1}{2}$ inch steel balls at 42 R. P. M. for 5 minutes, but being sufficiently frangible to completely disintegrate to discrete particles upon being mixed with unvulcanized rubber.

8. Dustless frangible compacted aggregates of particles of tetramethyl-thiuram-monosulfide, said particles being of a size to pass through a standard screen of substantially 100 mesh and being coated with from about 0.5% to about 3% of casein and from about 1% to about 5% of a triaryl phosphate which is liquid at 60° C. and in which the aryl radicals are of the benzene series; and said aggregates having a width of from $\frac{1}{16}$ to $\frac{1}{4}$ inch, a thickness of from $\frac{1}{16}$ to $\frac{1}{4}$ inch, and a length of from $\frac{1}{16}$ to about 1 inch, and having a mechanical strength such that not more than substantially 5% thereof will be disintegrated sufficiently to pass through a 16 mesh screen when a 50 gram sample is tumbled in a 16 ounce bottle with eight $\frac{1}{2}$ inch steel balls at 42 R. P. M. for 5 minutes, but being sufficiently frangible to completely disintegrate to discrete particles upon being mixed with unvulcanized rubber.

9. Dustless frangible compacted aggregates of particles of tetramethyl-thiuram-monosulfide, said particles being of a size to pass through a standard screen of substantially 100 mesh and being coated with from about 0.5% to about 1% of casein and about 3% of a triaryl phosphate which is liquid at 60° C. and in which the aryl radicals are of the benzene series; and said aggregates having a width of from $\frac{1}{16}$ to $\frac{1}{4}$ inch, a thickness of from $\frac{1}{16}$ to $\frac{1}{4}$ inch, and a length of from $\frac{1}{16}$ to about 1 inch, and having a mechanical strength such that not more than substantially 5% thereof will be disintegrated sufficiently to pass through a 16 mesh screen when a 50 gram sample is tumbled in a 16 ounce bottle with eight $\frac{1}{2}$ inch steel balls at 42 R. P. M. for 5 minutes, but being sufficiently frangible to completely disintegrate to discrete particles upon being mixed with unvulcanized rubber.

10. Dustless frangible compacted aggregates of particles of tetramethyl-thiuram-monosulfide, said particles being of a size to pass through a standard screen of substantially 100 mesh and being coated with about 1% of casein and about 3% of a tricresyl phosphate which is liquid at 60° C.; and said aggregates having a width of from $\frac{1}{16}$ to $\frac{1}{4}$ inch, a thickness of from $\frac{1}{16}$ to $\frac{1}{4}$ inch, and a length of from $\frac{1}{16}$ to about 1 inch, and having a mechanical strength such that not more than substantially 5% thereof will be disintegrated sufficiently to pass through a 16 mesh screen when a 50 gram sample is tumbled in a 16 ounce bottle with eight $\frac{1}{2}$ inch steel balls at 42 R. P. M. for 5 minutes, but being sufficiently frangible to completely disintegrate to discrete particles upon being mixed with unvulcanized rubber.

References Cited in the file of this patent

UNITED STATES PATENTS

| Number | Name | Date |
|---|---|---|
| 2,108,582 | Dunham | Feb. 15, 1938 |
| 2,127,560 | Haslam | Aug. 23, 1938 |
| 2,169,732 | Legg | Aug. 15, 1939 |
| 2,210,835 | Jones et al. | Aug. 6, 1940 |
| 2,265,303 | Moss | Dec. 9, 1941 |
| 2,326,984 | Tomlin | Aug. 17, 1943 |
| 2,343,835 | Smith | Mar. 7, 1944 |
| 2,427,238 | Swart | Sept. 9, 1947 |